(12) United States Patent
Yin

(10) Patent No.: US 8,197,379 B1
(45) Date of Patent: Jun. 12, 2012

(54) TRANSMISSION MECHANISM FOR POWER TOOL

(75) Inventor: Hsin-Chieh Yin, Taoyuan (TW)

(73) Assignee: Trinity Precision Technology Co., Ltd., Toufen Township (TW)

( * ) Notice: Subject to any disclaimer, the term of this patent is extended or adjusted under 35 U.S.C. 154(b) by 0 days.

(21) Appl. No.: 13/214,449

(22) Filed: Aug. 22, 2011

(30) Foreign Application Priority Data

Apr. 14, 2011 (TW) ................................ 00206547 U

(51) Int. Cl.
*F16H 3/46* (2006.01)

(52) U.S. Cl. ........................................ 475/299; 475/298
(58) Field of Classification Search .................. 475/298, 475/299

See application file for complete search history.

(56) References Cited

U.S. PATENT DOCUMENTS

| 6,431,289 | B1 * | 8/2002 | Potter et al. | 173/47 |
| 7,220,211 | B2 * | 5/2007 | Potter et al. | 475/298 |
| 2008/0032848 | A1 * | 2/2008 | Ho | 475/299 |

* cited by examiner

*Primary Examiner* — David D Le
*Assistant Examiner* — Derek D Knight
(74) *Attorney, Agent, or Firm* — Wang Law Firm, Inc.; Li K. Wang

(57) ABSTRACT

A transmission mechanism includes a first gear unit having an axially-movable ring gear and a second gear unit having an axially-movable fixing ring. The fixing ring includes first and second protrusions on two sides, respectively. When the ring gear moves, the first inner teeth and the outer teeth of the second planet gear disk are engaged with each other or disengaged from each other. When the fixing ring moves, the first protrusions and the first positioning ridges are engaged with each other or disengaged from each other, or the second protrusions and the second positioning ridges are engaged with each other or disengaged from each other. By the different combinations of the statuses due to movement of the ring gear and the fixing ring, the input speed from the motor gear is transferred into four different speeds which is output from an output shaft.

4 Claims, 5 Drawing Sheets

TRANSMISSION MECHANISM FOR POWER TOOL

BACKGROUND OF THE INVENTION

1. Field of the Invention

The present invention relates to a transmission mechanism for a power tool, and more particularly, to a transmission mechanism capable of providing four different torques and speeds.

2. The Prior Arts

Conventional power tools, such as a power drill, generally include a transmission mechanism for outputting power from a motor to an output shaft. Some of the transmission mechanisms can provide various speeds and therefore the speed of the output shaft is adjustable. However, most of the speed-adjustable transmission mechanisms provide only three speeds or less and the power tools capable of providing four speeds usually have complicated transmission mechanisms and higher manufacturing cost.

SUMMARY OF THE INVENTION

A primary objective of the present invention is to provide a four-speed transmission mechanism for a power tool with simple structure and reduced manufacturing cost.

The characteristic of the present invention is that a transmission mechanism comprises two gear units. By engagement of the two gear units, four different output speeds and torques can be output.

In order to achieve the objective, a transmission mechanism according to the present invention includes a first gear unit and a second gear unit. The first gear unit includes a first planet gear disk, a plurality of first planet gears, a ring gear having first inner teeth, a second planet gear disk having outer teeth and a first pinion, and a plurality of second planet gears. The first planet gears are connected to the first planet gear disk and engaged with the first inner teeth of the ring gear. The second planet gears are connected to the second planet gear disk and engaged with the first pinion. The ring gear is axially movable to engage the first inner teeth with the outer teeth of the second planet gear disk, or to disengage the first inner teeth from the outer teeth of the second planet gear disk. The first planet gear disk is connected with an output shaft. The second gear unit includes a third planet gear disk having a plurality of second positioning ridges, a fixing ring having a plurality of first protrusions and a plurality of second protrusions, an inner gear having a plurality of first positioning ridges and second inner teeth, and a plurality of third planet gears having a second pinion. The third planet gears are connected to the third planet gear disk and the second pinions are engaged with the second inner teeth of the inner gear. The third planet gears are engaged with a motor gear. The fixing ring is axially movable to engage the first protrusions with the first positioning ridges, or to engage the second protrusions with the second positioning ridges.

When the ring gear is moved to engage the first inner teeth with the outer teeth of the second planet gear disk and the fixing ring is moved to engage the first protrusions with the first positioning ridges, an input speed from the motor gear is transferred into a first speed (high speed) which is output from the output shaft.

When the ring gear is moved to engage the first inner teeth with the outer teeth of the second planet gear disk and the fixing ring is moved to engage the second protrusions with the second positioning ridges, an input speed from the motor gear is transferred into a second speed (mediate-high speed) which is output from the output shaft.

When the ring gear is moved to disengage the first inner teeth from the outer teeth of the second planet gear disk and the fixing ring is moved to engage the first protrusions with the first positioning ridges, an input speed from the motor gear is transferred into a third speed (mediate-low) which is output from the output shaft.

When the ring gear is moved to disengage the first inner teeth from the outer teeth of the second planet gear disk and the fixing ring is moved to engage the second protrusions with the second positioning ridges, an input speed from the motor gear is transferred into a fourth speed (low speed) which is output from the output shaft.

Preferably, the ring gear includes a first groove defined in an outer periphery thereof and a first rod is engaged with the first groove to control axial movement of the ring gear.

Preferably, the fixing ring includes a second groove defined in an outer periphery thereof and a second rod is engaged with the second groove to control axial movement of the fixing ring.

Preferably, the first and second protrusions are disposed on two opposite sides of the fixing ring and extend axially toward two opposite directions. The first positioning ridges are located on an outer periphery of the inner gear and the second protrusions are located on an outer periphery of the third planet gear disk.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
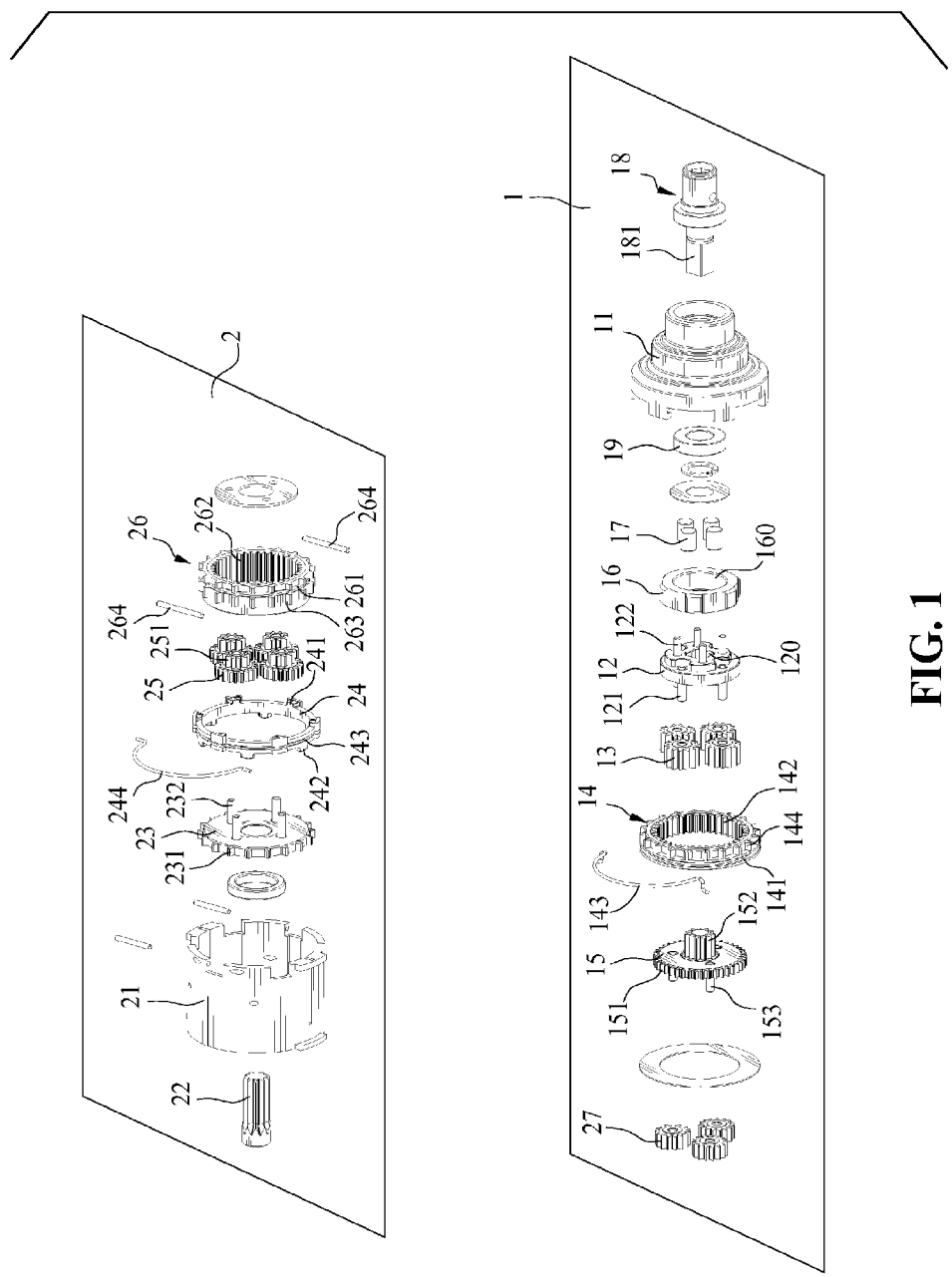
FIG. 1 is an exploded view to show a transmission mechanism according to an embodiment of the present invention.

Referring to FIG. 1, a transmission mechanism according to an embodiment of the present invention is disclosed and all of the parts have a first end and a second end which is located opposite to the first end. The first end is the direction that the output shaft of the power tool directs, and the second end is the direction that the motor gear is located.

Referring to FIGS. 1 to 5, especially to FIG. 1, the transmission mechanism comprises a first gear unit 1 and a second gear unit 2. The first gear unit 1 includes a first planet gear disk 12, a plurality of first planet gears 13, a ring gear 14 having a plurality of first inner teeth 142, a second planet gear disk 15 having a plurality of outer teeth 151 and a first pinion 152, and a plurality of second planet gears 27. The first planet gear disk 12 has a plurality of shafts 122 extending axially from the first end thereof, and a plurality of first planet gear shafts 121 axially extend from the second end of the first planet gear disk 12. Each of the first planet gear shafts 121 has one of the first planet gears 13 connected thereto, and each shaft 122 extends through a roller 17. An action member 16 is connected to the first end of the first planet gear disk 12 so that each roller 17 is located in a central hole 160 of the action member 16. Then, the first planet gear disk 12, the action member 16, the rollers 17 and a bearing 19 are connected in a front case 11 from the second end of the front case 11. An inner periphery of the front case 11 has a plurality of inner ribs 111 extending therefrom. The second end has an output shaft 18 which includes a polygonal shaft 181 which extends into the front case 11 from the first end of the front case 11. The output shaft 18 is cooperated with the bearing 19 and the polygonal shaft 181 extends through a polygonal hole 120 of the first planet gear disk 12. When the first planet gear disk 12 rotates, the first planet gear disk 12 cooperates with the rollers 17 and the action member 16 to drive the polygonal shaft 181 of the output shaft 18 to rotate. The action between the first planet gear disk 12, the rollers 17, the action member 16 and the output shaft 18 belongs to the prior art, and therefore the detail is not described here.

The ring gear 14 is a ring-shaped member and includes a first groove 141 defined in an outer periphery thereof and a plurality of outer ribs 144 extend axially from the ring gear 14. The first inner teeth 142 are defined in the inner periphery of the ring gear 14. The ring gear 14 is connected to the second end of the first planet gear disk 12 so that the first planet gears 13 are engaged with the first inner teeth 142. A C-shaped first rod 143 has two ends thereof engaged with the first groove 141 and the first rod 143 is connected to a rear case 21. When a user operates the first rod 143, the ring gear 14 is shifted axially and the outer ribs 144 are engaged with the inner ribs 111.

The second planet gear disk 15 has the outer teeth 151 and the first pinion 152 is connected to the first end of the second planet gear disk 15. The second end of the second planet gear disk 15 has a plurality of second planet shafts 153 connected thereto and each second planet shaft 153 is connected with one of the second planet gears 27. The second planet gear disk 15 is installed in the inside of the ring gear 14 and the first pinion 152 is engaged with the first planet gears 13. The user operates the first rod 143 to control the movement of the ring gear 14 to make the first inner teeth 142 of the ring gear 14 be engaged with or disengaged from the outer teeth 151 of the second planet gear disk 15.

The second gear unit 2 includes a third planet gear disk 23, a fixing ring 24, a plurality of third planet gears 25 and an inner gear 26. The third planet gear disk 23 has a plurality of second positioning ridges 231 disposed on an outer periphery thereof. The third planet gear disk 23 has a plurality of third planet gear shafts 232 extending axially from the first end thereof and each third planet gear shaft 232 is connected with one of the third planet gears 25. Each of the third planet gears 25 has a second pinion 251 co-axially connected to the first end thereof.

The fixing ring 24 is a ring-shaped member and includes a second groove 243 defined in an outer periphery thereof. The fixing ring 24 includes a plurality of first protrusions 241 extending axially from the first end thereof and a plurality of second protrusions 242 extending axially from the second end thereof. The inner gear 26 has a plurality of first positioning ridges 263 extending axially from the outside thereof and a third grove 261 defined in the outer periphery thereof. Second inner teeth 262 are defined in the inside of the inner gear 26. The third planet gear disk 23 connected with the third planet gears 25 are installed in the rear case 21. A C-shaped second rod 244 has two ends thereof engaged with the second groove 243 and the second rod 244 is connected with the rear case 21. The inner gear 26 is also installed in the rear case 21 and at least one pin 264 extends through a wall of the rear case 21 and is inserted into the third groove 261 to restrict the inner gear 26. Thus, the inner gear 26 can rotate in the rear case 21 and can not move axially. The front case 11 and the rear case 21 connect to form a complete case so as to accommodate the first and second gear units 1, 2. The motor gear 22 is connected to a motor (not shown) and extends into the rear case 21 from the second end of the rear case 21 to be engaged with the third planet gears 25. The second pinions 251 are engaged with the second inner teeth 262. The user can operate the second rod 244 to axially move the fixing ring 24 to engage the first protrusions 241 with the first positioning ridges 263, or engage the second protrusions 242 with the second positioning ridges 231.

Figure 2:
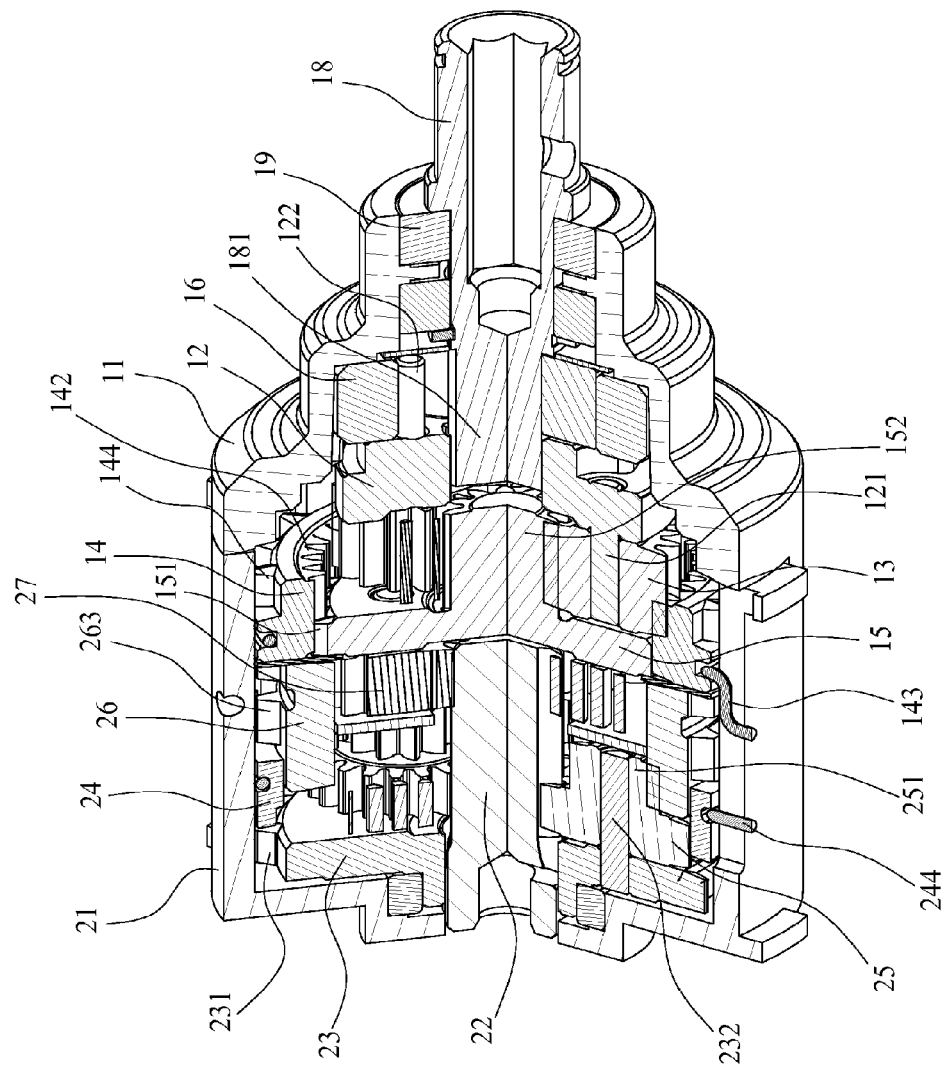
FIG. 2 is a perspective view, partially removed, to show the transmission mechanism of the present invention, wherein the output speed is switched to high.

As shown in FIG. 2, when the user operates the first rod 143, the ring gear 14 is shifted axially toward the second end so that the first inner teeth 142 are engaged with the outer teeth 151 of the second planet gear disk 15. The second rod 244 is also operated to move the fixing ring 24 toward the first end so that the first protrusions 241 are engaged with the first positioning ridges 263 of the inner gear 26. At this state, the inner gear 26 cannot rotate. When the motor gear 22 rotates in the forward direction, the second planet gears 27 are rotated in the reverse direction and the second planet gear disk 15 rotates in the forward direction. Because the ring gear 14 is engaged with the first planet gears 13 and the second planet gear disk 15, the ring gear 14, the second planet gear disk 15 and the first planet gear disk 12 rotate simultaneously. Therefore, the input speed from the motor gear 22 is transferred into a first speed (high) which is output from the output shaft 18.

Figure 3:
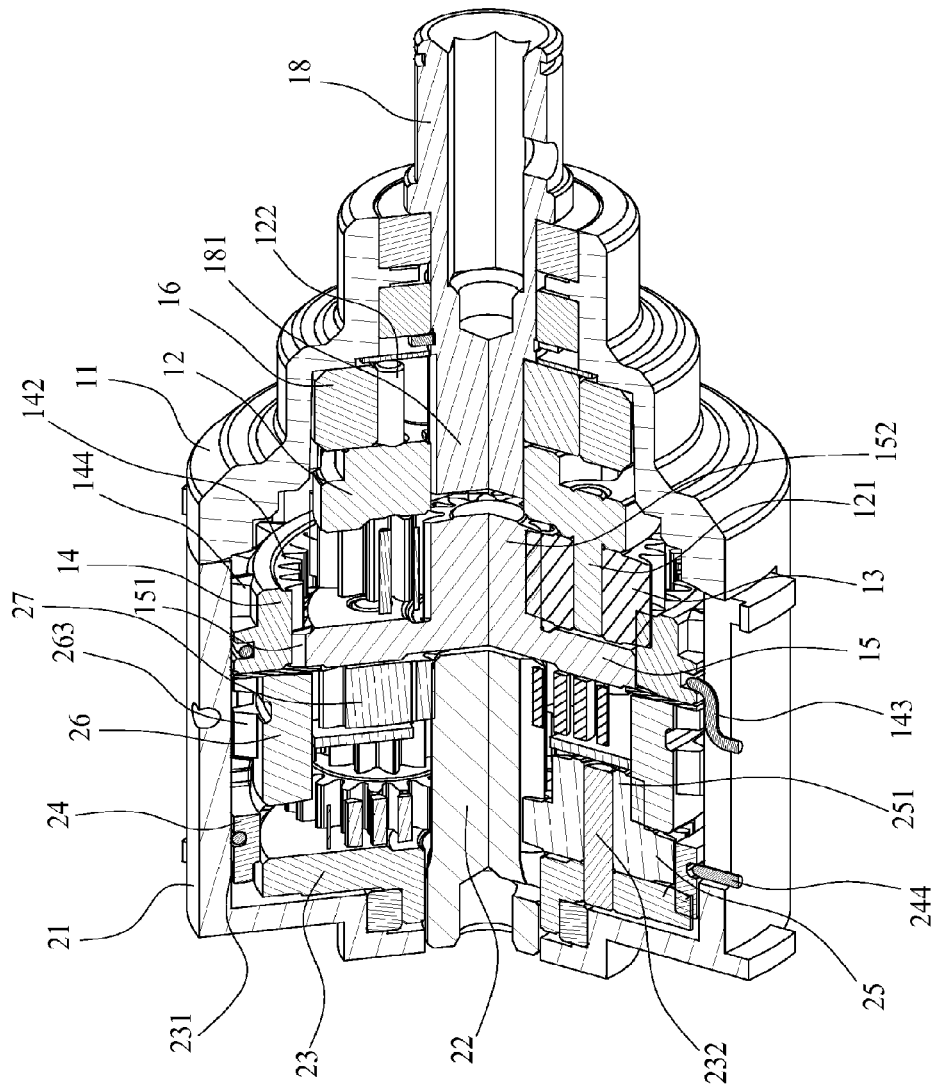
FIG. 3 is a perspective view, partially removed, to show the transmission mechanism of the present invention, wherein the output speed is switched to mediate-high.

As shown in FIG. 3, when the user operates the first rod 143, the ring gear 14 is shifted axially toward the second end so that the first inner teeth 142 are engaged with the outer teeth 151 of the second planet gear disk 15. The second rod 244 is also operated to move the fixing ring 24 toward the second end so that the second protrusions 242 are engaged with the second positioning ridges 231 of the third planet gear disk 23. At this state, the third planet gear disk 23 cannot rotate. When the motor gear 22 rotates in the forward direction, the second planet gears 27 are rotated in the reverse direction and the inner gear 26 rotates in the reverse direction so that the second planet gear disk 15 rotates in the forward direction and reduces its speed. Because the ring gear 14 is engaged with the first planet gears 13 and the second planet gear disk 15, the ring gear 14, the second planet gear disk 15 and the first planet gear disk 12 rotate simultaneously. Therefore, the input speed from the motor gear 22 is transferred into a second speed (mediate-high) which is output from the output shaft 18.

Figure 4:
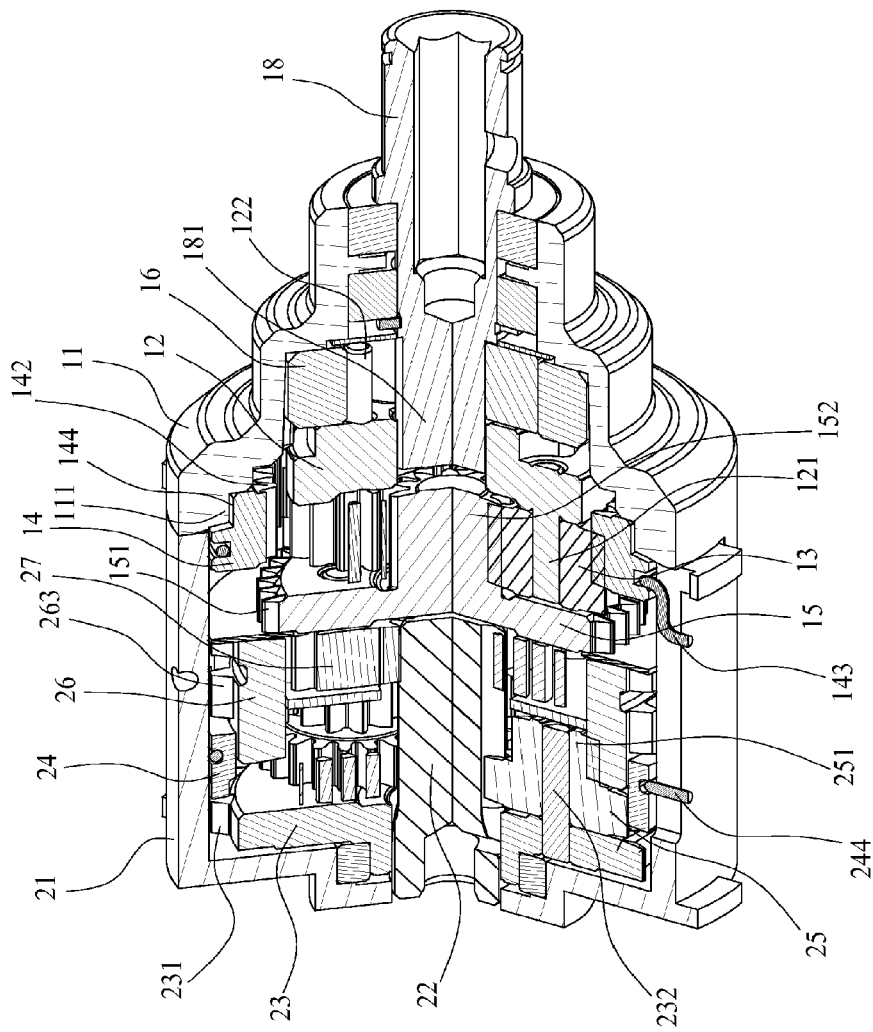
FIG. 4 is a perspective view, partially removed, to show the transmission mechanism of the present invention, wherein the output speed is switched to mediate-low.

As shown in FIG. 4, when the user operates the first rod 143, the ring gear 14 is shifted axially toward the first end so that the first inner teeth 142 of the ring gear 14 are disengaged from the outer teeth 151 of the second planet gear disk 15 and the outer ribs 144 of the ring gear 14 are engaged with the inner ribs 111 of the front case 11. The second rod 244 is also operated to move the fixing ring 24 toward the first end so that the first protrusions 241 of the fixing ring 24 are engaged with the first positioning ridges 263 of the inner gear 26. At this state, the inner gear 26 cannot rotate. When the motor gear 22 rotates in the forward direction, the second planet gears 27 are rotated in the reverse direction and the second planet gear disk 15 rotates in the forward direction. Because the ring gear 14 is engaged with front case 11, the ring gear 14 cannot rotate. The first pinion 152 of the second planet gear disk 15 drives the first planet gears 13 to rotate in the reverse direction. The first planet gear disk 12 reduces its speed and rotates in the forward direction so that the input speed from the motor gear 22 is transferred into a third speed (mediate-low) which is output from the output shaft 18.

Figure 5:
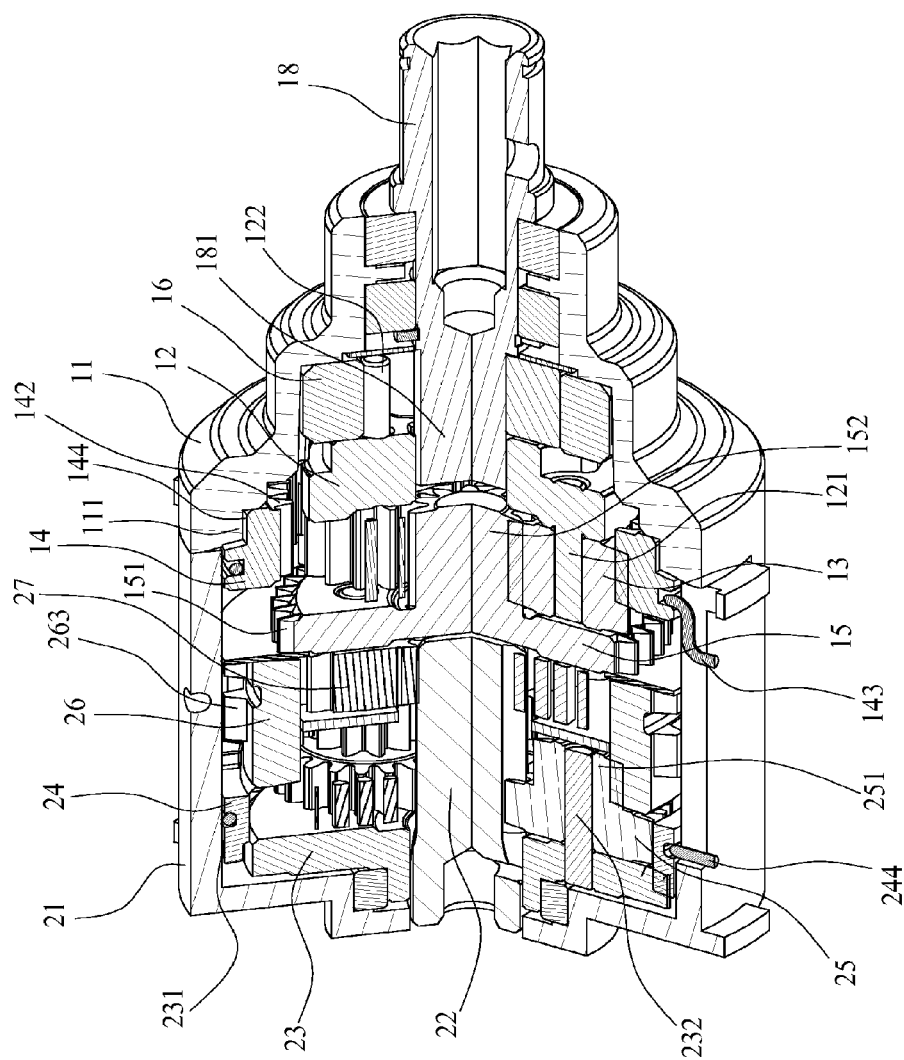
FIG. 5 is a perspective view, partially removed, to show the transmission mechanism of the present invention, wherein the output speed is switched to low.

As shown in FIG. 5, when the user operates the first rod 143, the ring gear 14 is shifted axially toward the first end so that the first inner teeth 142 of the ring gear 14 are disengaged from the outer teeth 151 of the second planet gear disk 15 and the outer ribs 144 of the ring gear 14 are engaged with the inner ribs 111 of the front case 11. The second rod 244 is also operated to move the fixing ring 24 toward the second end so that the second protrusions 242 of the fixing ring 24 are engaged with the second positioning ridges 231 of third planet gear disk 23. At this state, the third planet gear disk 23 cannot rotate. When the motor gear 22 rotates in the forward direction, the second planet gears 27 and the inner gear 26 are rotated in the reverse direction. Therefore, the second planet gear disk 15 reduces its speed and rotates in the forward direction. Because the ring gear 14 is engaged with front case 11, the ring gear 14 cannot rotate. The first pinion 152 of the second planet gear disk 15 drives the first planet gears 13 to rotate in the reverse direction. The first planet gear disk 12 is reduced its speed and rotates in the forward direction so that the input speed from the motor gear 22 is transferred into a fourth speed (low) which is output from the output shaft 18.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A transmission mechanism, comprising:
a first gear unit including a first planet gear disk, a plurality of first planet gears, a ring gear having a plurality of first inner teeth, a second planet gear disk having a plurality of outer teeth, a plurality of second planet shafts, and a first pinion, and a plurality of second planet gears, the first planet gears being connected to the first planet gear disk, the first pinion being engaged with the first planet gears, the second planet gears being connected to the plurality of second planet shafts on the second planet gear disk, the ring gear being axially movable to engage the first inner teeth with the outer teeth of the second planet gear disk, or to disengage the first inner teeth from the outer teeth of the second planet gear disk, the first planet gear disk connected with an output shaft; and
a second gear unit including a third planet gear disk having a plurality of second positioning ridges, a fixing ring having a plurality of first protrusions and a plurality of second protrusions, an inner gear having a plurality of first positioning ridges and a plurality of second inner teeth, and a plurality of third planet gears having a second pinion, the third planet gears connected to the third planet gear disk and the second pinions engaged with the second inner teeth of the inner gear, the third planet gears engaged with a motor gear, the fixing ring being axially movable to engage the first protrusions with the first positioning ridges, or to engage the second protrusions with the second positioning ridges;
wherein when the ring gear is moved to engage the first inner teeth with the outer teeth of the second planet gear disk and the fixing ring is moved to engage the first protrusions with the first positioning ridges, an input speed from the motor gear is transferred into a first speed which is output from the output shaft;
when the ring gear is moved to engage the first inner teeth with the outer teeth of the second planet gear disk and the fixing ring is moved to engage the second protrusions with the second positioning ridges, an input speed from the motor gear is transferred into a second speed which is output from the output shaft;
when the ring gear is moved to disengage the first inner teeth from the outer teeth of the second planet gear disk and the fixing ring is moved to engage the first protrusions with the first positioning ridges, an input speed from the motor gear is transferred into a third speed which is output from the output shaft;
and when the ring gear is moved to disengage the first inner teeth from the outer teeth of the second planet gear disk and when the fixing ring is moved to engage the second protrusions with the second positioning ridges, an input speed from the motor gear is transferred into a fourth speed which is output from the output shaft.

2. The mechanism as claimed in claim 1, wherein the ring gear comprises a first groove defined in an outer periphery thereof and a first rod is engaged with the first groove to control movement of the ring gear.

3. The mechanism as claimed in claim 1, wherein the fixing ring comprises a second groove defined in an outer periphery thereof and a second rod is engaged with the second groove to control movement of the fixing ring.

4. The mechanism as claimed in claim 1, wherein the first protrusions and the second protrusions extend axially from two opposite sides of the fixing ring, the first positioning ridges are located on an outer periphery of the inner gear and the second protrusions are located on an outer periphery of the third planet gear disk.

* * * * *